United States Patent [19]
Keller

[11] Patent Number: 5,247,060
[45] Date of Patent: Sep. 21, 1993

[54] CURING PHTHALONITRILES WITH ACID

[75] Inventor: Teddy M. Keller, Alexandria, Va.

[73] Assignee: The United States of America as represented by the Secretary of the Navy, Washington, D.C.

[21] Appl. No.: 818,672

[22] Filed: Jan. 9, 1992

[51] Int. Cl.$^5$ ............................................. C08G 63/44
[52] U.S. Cl. .................................... 528/362; 528/170; 528/171; 528/172; 528/173; 528/183; 528/188; 528/206; 528/207; 528/208; 528/337; 528/352; 528/353
[58] Field of Search ............... 528/362, 183, 188, 170, 528/171, 172, 173, 206, 207, 208, 337, 352, 353

[56] References Cited

U.S. PATENT DOCUMENTS 4,408,035  10/1983  Keller .................................. 528/183
4,410,676  10/1983  Keller .................................... 528/9

OTHER PUBLICATIONS

U.S. patent application entitled "Curing Phthalonitrile Resins" of Burchill and Keller filed Jan. 9, 1992, Ser. No. 07-818,575.

Primary Examiner—Harold D. Anderson
Attorney, Agent, or Firm—Thomas E. McDonnell; George A. Kap

[57] ABSTRACT

Curing of phthalonitrile monomers and prepolymers is accelerated by inclusion of an acid curing agent. Cured phthalonitrile polymers have high thermal oxidative stability and are useful as resins in various compositions and as adhesives.

18 Claims, No Drawings

CURING PHTHALONITRILES WITH ACID

BACKGROUND OF THE INVENTION

The invention relates generally to high temperature polymers and in particular to phthalonitrile polymers and their cure.

There is an extensive range of applications for phthalonitrile resins including as matrix materials for lightweight, high temperature resistant carbon fiber composites for use in aircraft engine nacelles, as binding filler suitable for use in clutch or brake linings, and in hot molds as casting material.

Interest in fiber-reinforced composites for advanced aerospace applications has led to the search for high temperature polymers that are easily processed and exhibit high thermal and oxidative stability. Epoxies and polyimides are now being used but each has its disadvantages. Conventional epoxy-based composites and adhesives have a 200° C. maximum service limit and polyamide resins used in composites matrices have a 300° C. maximum service limit.

A major problem of the polyamide system is the inability to process void-free and blister-free components in high yield because of the evolution of volatile components formed during the polymerization condensation reaction. Other problems associated with both polyamide and epoxies include their brittleness, water absorptivity and engineering reliability.

Phthalonitrile resins are proving to be superior in physical and chemical properties to epoxies, polyimides and other plastics as matrices for fiber-reinforced composites and in other applications. A major advantage of phthalonitrile resins, compared to other plastics, is their ability to withstand temperatures in excess of 300° C. for extended periods without permanent damage to the coatings, plastics or composites made therefrom. Such resins usually contain a substantial proportion of aromatic structures, but cured polymers composed solely of aromatic rings tend to be brittle and intractable. A resin having flexible linkages between the aromatic rings minimizes or greatly reduces brittleness and intractability. Polyphthalonitrile resins with diether linkages are materials which meet these goals.

To achieve the objective of developing polymeric materials that are easily processable and exhibit superior thermooxidative properties relative to current commercial polymers, phthalonitrile monomers containing aryl, ether, imide, sulfonyl, thioether, and fluorine moieties have been synthesized and polymerized. Neat polymerization of these monomers, which do not contain active hydrogen atoms, is extremely difficult and requires several days of continuous heating at 260°-300° C. before a viscosity increase becomes evident.

OBJECTS OF THE INVENTION

It is an object of this invention to use a method of polymerizing di-phthalonitrile monomers to form a phthalonitrile resin using the acid curing agents disclosed herein.

It is an object of this invention to produce a polymeric material which can be cured at a lower temperature in a shorter period of time.

It is an object of this invention to produce polymeric materials with fewer or no voids.

It is an object of this invention to produce phthalonitrile resins which are thermally and oxidatively stable and have good mechanical properties at temperatures in excess of 300° C.

These and other objects are accomplished by polymerizing di-phthalonitriles with an effective amount of an acid to obtain cured polymers of phthalonitriles.

DETAILED DESCRIPTION OF THE INVENTION

This invention relates to curing or polymerization involving organic and inorganic acids and derivatives thereof for curing di-phthalonitrile monomers or prepolymers. This is especially useful for resins that are processed at high temperatures due to the thermal stability and nonvolatility of both the curing agents and the phthalonitrile/acid intermediates. Any acid can be used to polymerize di-phthalonitrile monomers or prepolymers such as di-phthalontrile oligomers.

Any di-phthalonitrile monomer capable of forming polymeric materials can be polymerized with the curing agents disclosed herein. The curing agents are especially useful for the polymerization of highly aromatic di-phthalonitrile monomers having melting points above 150° C., preferably above about 200° C.

Phthalonitrile monomers which have melting points exceeding 150° C., including the higher temperature processing ones, can be easily fabricated into shaped components in a controlled manner as a function of the organic or inorganic acid and curing temperature.

The advantages of this invention are best realized in connection with polymerization of di-phthalonitrile monomers which are devoid of active hydrogen atoms. Such monomers are represented by the following formula which can be substituted or unsubstituted:

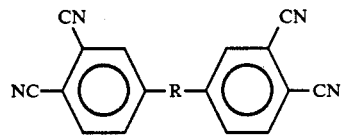

where R is a bridge containing a bisphenol group, a diether or a polyether group, a dithioether group, an amide group, an imide group, an —SAS— group wherein S is a sulfur atom and A is an aromatic or aliphatic hydrocarbon group, an ether group, an ether and imide group, a sulfone group, halogenated hydrocarbon group, an oxyaromatic group, and a carboxyl group. In a preferred embodiment, R is a bridge selected from bisphenol containing none or at least one halogen substituent; diethoxy containing intermediate imide and tetravalent aromatic radicals; diethoxy of OR'O formula where R' is —ArC$_n$H$_{2n}$Ar—, —Ar$_m$—, ArC$_3$F$_6$Ar—, —C$_n$H$_{2n}$—, —ArSO$_2$Ar—, —ArCOAr— where m is an integer of 1–10, more preferably 1–3, n is an integer of 2–30, more preferably 6–20 carbon atoms, and Ar represents an aromatic, more preferably phenylene group; diethoxy containing intermediate polysulfone and polyphenylene radicals; and alkylene hydrocarbons containing fluorine substituents separated by oxygen atoms.

Examples of suitable di-phthalonitrile monomers are given in U.S. Pat. Nos. 4,209,458; 4,223,123; 4,226,801; 4,234,712; 4,238,601; 4,304,896; 4,315,093; 4,351,776; 4,409,782; and 5,003,078. All of these references are incorporated herein for their disclosure of the monomers which can be polymerized with the curing agents disclosed herein.

Examples of specific di-phthalonitrile monomers described herein include bis (3,4-dicyanophenyl-2-tetrafluoroethoxy) -1,5-perfluoropentane, bis (3,4-dicyanophenyl)hexene, bis (3,4-dicyanophenyl)ether of bisphenol A or bisphenol S, bis (3,4-discyanophenyl)ether of 4,4'-dihydroxybenzophenone, bisorthodinitrile of hexafluoroacetone bisphenol A, 4,4'-bis (3,4-dicyanophenoxy) diphenyloxide, 4,4'-bis (3,4-dicyanophenoxy)-biphenyl, 2,7-bis (3,4-dicyanophenoxy) naphthalene, oligomeric polyarylether sulfone phthalonitrile monomer, 1,3 or 1,4-bis (3,4-dicyanophenoxy) benzene, imide-containing di-phthalonitrile from 3,3',4,4'-benzophenonetetracarboxylic dianhydride, 4-(3-aminophenoxy) phthalonitrile, 4,4'-(hexafluoroisopropylidene)diphthalic anhydride, and 4,4'-bis (3,4-dicyanothiophenoxy)biphenyl, 2,2'-bis [4-(3,4-dicyanophenoxy)phenyl] hexafluoropropane, and 2,2'-bis [4-(3,4-dicyanophenoxy)phenyl]propane.

The curing agent suitable herein is selected from acids which are proton donors or electron acceptors. This includes organic and inorganic or mineral acids which are characterized by the presence of hydrogen atoms and which, upon dissociation, provide hydrogen ions Some of the curing agents are selected from acids having ionization constant (Ki) in the range of 1 to $1 \times 10^{-5}$, preferably 0.1 to $1 \times 10^{-4}$. In practical terms, suitable acids for polymerizing di-phthalonitrile monomers or prepolymers thereof include acids from the strongest such as sulfuric acid to the weakest such as acetic acid. In a preferred embodiment, the curing agents herein are selected from strong mineral and strong aromatic acids which contain at least one aryl, such as phenyl, moiety and at least one inorganic substituent. Also included herein as curing agents for di-phthalonitrile monomers or prepolymers are Lewis acids which can accept electrons. It should be understood that whatever curing agent is utilized, the curing agent must be stable at the curing temperature or if it decomposes at the curing temperature, at least one of the decomposition products must be effective in curing the monomer or prepolymer.

Suitable inorganic or mineral acids herein include sulfuric acid, sulfurous acid, phosphoric acid, phosphorous acid, nitric acid, hydrobromic acid, hydrochloric acid, perchloric acid, boric acid and others.

Suitable organic aromatic acids include p-toluenesulfonic acid, aniline-2-sulfonic acid, 8-aniline-1-naphthalenesulfonic acid, benzene sulfonic acid, butylsulfonic acid, 10-camphorsulfonic acid,2,5-diaminobenzenesulfonicacid,6-dimethylamino-4-hydroxy-2-naphthalenesulfonic acid, 5-dimethylamino-1-naphthalenesulfonic acid, 4-hydroxy-3-nitroso-1-naphthalenesulfonic acid tetrahydrate, 8-hydroxyquinoline-5-sulfonic acid, methylsulfonic acid, phenylboric acid, 1-naphthalenesulfonic acid, 2-naphthalenesulfonic acid, 1,5- naphthalenedisulfonic acid, 2,6-naphthalenedisulfonic acid, 2,7- napthalenedisulfonic acid, picrylsulfonic acid hydrate, 2-pyridineethanesulfonic acid, 4-pyridineethanesulfonic acid, 3-pyridinesulfonic acid, 2-pyridinylhydroxymethanesulfonic acid, sulfanilic acid, 2-sulfobenzoic acid hydrate, 5-sulfosalicylic acid hydrate, 2,4-xylenesulfonic acid, and sulfonic acid containing dyes.

Organic phosphorus-containing acids suitable herein include phenylphosphinic acid, dipenylphosphinic acid, propylphosphonic acid, 1-aminoethylphosphonic acid, 4-aminophenylphosponic acid, butylphosphonic acid,t-butylphosphonic acid, 2-carboxyethylphosphonic acid, 2-chloroethylphosphonic acid, dimethylphosphonic acid, ethylphosphonic acid, methylenediphosphonic acid, methylphosphonic acid, phosphonoacetic acid, bis(hydroxyymethyl) phosphonic acid, chloromethylphosphonic acid, di-n- butylphosphonic acid, dichloromethylphosphonic acid, diphenyldithiophosphonic acid, 1,2-ethylenediphosphonic acid, nhystaderylphosphonic acid, hydroxymethylphosphonic acid, n-octadecylphosphonic acid,n-octylphosphonic acid, phenylphosphonic acid, propylenediphosphonic acid; n-tetradecylphosphonic acid.

Suitable Lewis acids include aluminum compounds such as aluminum chloride, aluminum bromide, aluminum n-butoxide, aluminum sec-butoxide, aluminum sec-butoxide stearate, aluminum t-butoxide, aluminum di(sec-butoxide)acetoacetic, aluminum di(isopropoxide) acetoacetic ester chelate, aluminum fluoride, aluminum hydroxide, aluminum iodide, aluminum isopropoxide, aluminum nitrate, aluminum oxide, aluminum 2,4-pentanedionate, aluminum perchlorate, aluminum phenoxide, aluminum phosphate, aluminum sulfide. Lewis acids also include gallium compounds such as gallium bromide and gallium chloride, and boron compounds such as boron oxide, triphenylborane, and methylbroane dihydroxide and mixtures thereof. It should be understood that the Lewis acids are to be used in an effective amount for curing purposes, as described herein. A Lewis acid, for purposes herein, is a substance that has six electrons in the outer orbit and, therefore can accept a pair of electrons to complete the orbital.

An effective amount of the curing agent is to be used. Generally, the more curing agent that is used the quicker is polymerization. Weight amount of the curing agent relative to the weight of the monomer can vary from a trace amount of a strong acid to as much as 40% of a weak acid. In a preferred embodiment, the amount can vary from 0.1% to 20%, especially 1-5%. The curing time will vary with the strength or acidity of the curing agent, amount thereof, and curing temperature. In a preferred embodiment, the curing time can vary from instantaneous to 10 hours, more preferably from 1 minute to 1 hour, and especially 2 minutes to ½ hour. The curing temperature is in the range of above melting temperature of the solid monomer and below about 350° C., especially in the range of above curing temperature.

A residue of the curing agent can remain after the polymer is formed. Amount of this residue is at a trace level since it is desired to have as little as possible of the unreacted curing agent in the polymer. Tg of the polymer obtained with the curing agents disclosed herein is at least 250° C., preferably above 300° C.

It is possible with the present invention to include a metal or a non-Lewis acid metal salt in the monomers or prepolymers in amount of 1-40% by weight of the monomer, preferably 1-10%. For composite fabrication, a salt or a metal would be less desirable because of problems with homogeneity and gassing. The preferred metals are copper, silver, and iron, and mixtures thereof.

Polymerization of the monomer involves mixing a monomer or a prepolymer and a curing agent together following which, the curing agent promotes polymerization of the monomer. More specifically, the method involves mixing a molten di-phthalonitrile monomer or a prepolymer thereof with a curing agent, heating the mixture at a temperature below the decomposition temperature of the resin or prepolymer at which temperature the mixture is molten for a time sufficient to cure or polymerize the monomer or prepolymer to form the resin or polymer as evidenced by increased gelation or increased viscosity.

Generally, the polymerization reaction is performed by heating the monomer or prepolymer to a temperature in the range from about its melting point to about its decomposition temperature to render it liquid, and mixing the curing agent in an effective amount. After melting the monomer and mixing in the curing agent, the mixture is heated to polymerize the monomer as evidenced by increased gelation. Following polymerization, the polymer or prepolymer is heat-treated to develop its properties. The cure heating is generally accomplished at 180°–280° C., preferably 200°–260° C. Postcuring can be accomplished by further heating to enhance physical properties. The postcure can be accomplished by heating at a temperature up to about 500° C. for up to 24 hours, preferably at 300°–400° C. for 2 to 16 hours.

Alternatively, the monomer-curing agent mixture can be heated for up to 28 hours to any viscosity desired by a fabricator or any one else and quenched at a stage before gelation occurs. The resulting prepolymer can be pulverized and stored indefinitely at room temperature without further reaction. When needed, the prepolymer can be processed above the glass transition temperature, which has been greatly suppressed relative to the original melting point of the monomer. The curing cycles for the prepolymer would be the same as those recommended above. The stability of the prepolymer at ambient temperature is particularly appealing for the preparation of prepregs and their applications as laminates for fiber-reinforced composites.

The polymerization reaction described herein occurs by an electrophilic attack of the proton of the acid group with the cyano units of the di-phthalonitrile monomer or prepolymers. Only minute quantities of a strong acid are needed to initiate the polymerization. However, the rate of polymerization to gelation does depend on the concentration of the curing agent which supplies the acid or acidity group. Further reaction of the protonic species with additional phthalonitrile monomer or prepolymer results in the formation of a highly crosslinked polymeric material. The polymers are light green after curing with an amine at about 315° C. and change to dark brown when postcured at about 375° C. These observations indicate that different polymerization products are formed relative to the dark green amine cured phthalonitrile-based products upon identical thermal exposure. When cured with the acidic curing agent disclosed herein the resulting polymer is of a brown color which remains brown after postcuring. In the case of a Lewis acid, the acid probably interacts with the non-bonding electron of the cyano groups on the phthalonitriles. This leads to complexation and reaction thereof with additional phthalonitrile units to form the polymer.

The following represents experimental work on di-phthalonitrile resins produced in accordance with a preferred embodiment of the present invention.

EXAMPLE 1

This example demonstrates polymerization of 4,4'-bis (3,4-dicyanophenoxy) biphenyl monomer with p-toluenesulfoonic acid. The monomer is believed to have the following structural formula:

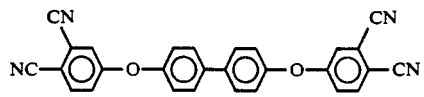

The monomer sample in amount of 0.5% grams, which was a crystalline solid at room temperature, was placed in an aluminum planchet and the planchet was then placed on a hot plate preheated to 250° C. When the monomer melted, 0.01% gram of toluenesulfonic acid was added with stirring for 10–15 seconds and the monomer solidified to a brown resin in about 2 hours while standing on the hot plate to indicate polymerization. The solid resin appeared in a non amorphous phase. The brown solid was further postcured at 250° C. for 6 hours and at 315° C. for 16 hours to develop physical properties, such as an increase of glass transition temperature.

EXAMPLE 2

This example demonstrates polymerization of 4,4,-bis (3,4-dicyanophenoxy) biphenyl monomer, the same monomer as in Ex. 1, with 2-naphthalenesulfonic acid monohydrate curing agent.

Here 1.0 gram of the monomer was placed in an aluminum planchet and melted on a hot plate preheated to 250° C. To the melted monomer was added with stirring 0.05% gram of the curing agent. After 1½ hours on the hot plate, the sample became very viscous and gelation or solidification occurred after about 2 hours on the hot plate. The sample was further heated at 250° C. for 2 hours and then at 280° C. for 1 hour and at 315° C. for 6 hours to advance the cure and improve the physical properties. A portion of the sample was postcured in an inert atmosphere in sequence of 350° C. for 3 hours and at 375° C. for 16 hours. Thus the physical properties of the polymer was controlled as a function of the curing temperature and time.

EXAMPLE 3

This example demonstrates polymerization of 2,2-bis [4-(3,4-dicyanophenoxy)phenyl] hexafluoropropane monomer with concentrated sulfonic acid. The monomer is believed to have the following structural formula:

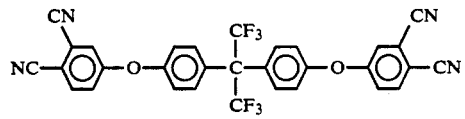

The monomer sample in amount of 1.0 gram was placed in an aluminum planchet and melted on what plate preheated to 250° C. A small drop of concentrated sulfonic acid amounting to about 0.5% by weight was stirred into the melted sample. After 2 hours of heating on the hot plate at 250° C., the sample gelled or solidified. The sample polymer was then heated for an additional 1 hour at 250° C., at 280° C. for 3 hours, and at 315° C. for 6 hours to enhance physical properties thereof.

EXAMPLE 4

This example demonstrates polymerization of 4,4'-bis (3,4-dicyanophenoxy) biphenyl monomer, the same monomer as in Ex. 1, with concentrated sulfurous acid.

Herein, 1.0 gram of the monomer sample was placed in an aluminum planchet and melted on a hot plate preheated to 250° C. While stirring the melt with a small stirring bar was added a small drop of about 0.001 gram or 0.5% by Weight of concentrated sulfurous acid. The stirring bar was removed viscous 1½ hour thereafter, and it gelled in another 30 minutes. To complete the cure and to enhance physical properties, the sample was heated additionally at 250° C. for 1 hour, at 280° C. for 3 hours, and at 315° C. for 16 hours.

EXAMPLE 5

This example demonstrates polymerization of 2,2-bis [4-(3,4-dicyanophenoxy)phenyl] hexafluoropropane monomer with 3-amino-4-hydroxybenzenesulfonic acid as the curing agent. The monomer is believed to have the following structural formula:

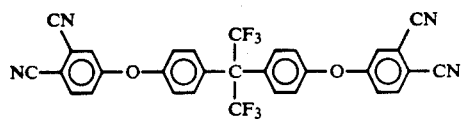

The monomer sample in amount of 1.0 gram was placed in an aluminum planchet and melted on a hot plate preheated to 210° C. To the molten monomer was added 0.02 gram of 3-amino-4-hydroxybenzenesulfonic acid with stirring. After 30 minutes on the hot plate at 210° C., an increase in viscosity was detected indicating that polymerization reaction was occurring. Further heating of the sample overnight at 200° C., resulted in solidification of the sample and the formation of a polymer.

A catalytic amount or a minute quantity of a strong organic acid is all that is needed to initiate the polymerization reaction of di-phthalonitrile-based monomer or prepolymer. Any organic sulfonic acid which is thermally stable can be used as a curing agent regardless of substitution. The rate of reaction and time to gelation at a given temperature can be controlled as a function of amount of the curing agent added.

EXAMPLE 6

This example demonstrates polymerization of a monomer, prepared from the reaction of 3,3', 4,4'-benzophenoneteracarboxylic dianhydride and 4-(4-aminophenoxy)phthalonitrile, with phenylphosphonic acid curing agent. The monomer is believed to have the following structural formula:

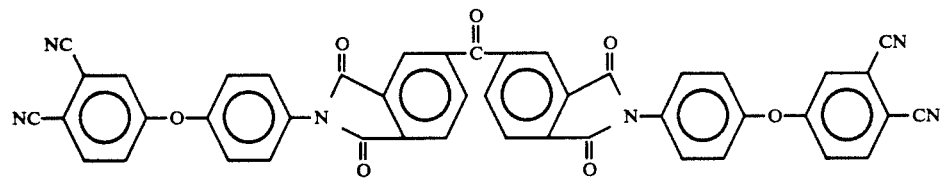

The monomer sample in amount of 1.0 gram was placed in an aluminum planchet and melted on a hot plate preheated to 260° C. To the molten monomer was added with stirring 0.02 gram of phenylphosphonic acid. After 45 minutes, it was observed that the sample had solidified. The sample was then further heat treated to advance the polymerization reaction and to enhance physical properties by heating the sample at 260° C. for 1 hour and then at 315° C. for 10 hours.

EXAMPLE 7

This example demonstrates polymerization of 4,4-bis (3,4-dicyanophenyoxy) biphenyl monomer, same as in Ex. 1, with boric and phenyboric acids.

The monomer sample in amount of 1.0 gram was placed into a clean aluminum planchet and melted on a hot plate preheated at 250° C. To the molten metal was added with stirring 0.01 gram of boric acid. After 20 minutes of heating on the hot plate at 250° C., an increase in viscosity was observed. When observed 2 hours later, the sample had already gelled.

Phenylboric acid was tried as a curing agent in the same manner as boric acid. The hot plate temperature was 250° C. and amount of phenylboric acid added to the monomer was 1% by weight. After 30 minutes of heating on the hot plate at 250° C., viscosity increased and after 3 hours, it was observed that the sample had already solidified This example has demonstrated that boric acid and organic boric acids can be used as curing agents to obtain di-phthalonitrile polymers and prepolymers. Examples of other suitable organic boric acids include 4-bromophemyl-boric acid, 1-butanebromic acid, 3-nitrophenylboric acid, phenylboric acid, 3-aminobenzeneboric acid, and 2,4-dichlorobenzeneboric acid.

EXAMPLE 8

This example demonstrates polymerization of 4,4'-bis (3,4-dicyanophenoxy) biphenyl monomer, same as in Ex. 1, with 7-amino-1,3-naphthalenedisulfonic acid curing agent.

The monomer sample in amount of 0.1 gram was placed in an aluminum planchet and melted on a hot plate preheated to 250° C. To the molten monomer was added with stirring 0.02 gram of 7-amino-1,3-naphthalenedisulfonic acid. After 3 hours on the hot plate at 250° C., the sample became fairly viscous and after then heated at 250° C. for additional 3 hours, at 280° C. for 4 hours, and at 315° C. for 12 hours.

Based on experimental data, it appears that a strong organic acid substituted with an amino group is effective in curing phthalonitrile monomers to polymers or prepolymers. It is believed that with such curing agents, that both the amino and of the phthalonitrile to initiate and propagate the polymerization reaction.

Many additional curing agents were tried and were shown to provide polymers or prepolymers from the di-phthalonitrile monomers described herein. These curing agents include benzenesulfonic acid, p-toluenesulfonic acid monohydrate, naphthalenesulfonic acid, and its monohydrate, sulfonic acid, sulfanilic acid, sulfuric acid, 3-amino-4-hydroxybenzenesulfonic acid, phenylphosphinic acid, propylphosphonic acid, aluminum trichloride, and boric acid. Curing with nitric acid produced evolution of volatiles, probably steam.

What is claimed is:

1. Method for preparing a polymer comprising: (a) heating a diphthalonitrile monomer to a temperature in the range from the melting point of said di-phthalonitrile monomer to the decomposition temperature of said polymer; (b) mixing an effective amount of a curing agent with said monomer, said curing agent is selected from the group consisting of acids having ionization constants from 1 to $1 \times 10^{-5}$; (c) continuing the step of heating until gelation occurs and said polymer is obtained having Tg in excess of 250° C.; said monomer having the following structural formula:

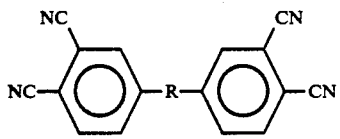

wherein R is selected from the group consisting of diethoxy of the formula —OR'O— and alkylene hydrocarbons containing fluorine substituents, where R' is selected from the group consisting of —ArC$_n$H$_{2n}$Ar—, —Ar$_m$—, —ArC$_3$F$_6$Ar—, —C$_n$H$_{2n}$—, —ArSO$_2$Ar—, —ArCOAr—, and mixtures thereof, m is an integer of 1-10, n is an integer of 2-30, and Ar represents an aromatic group.

2. Method of claim 1 wherein m is 1-3, n is an integer from 6-20, and Ar represents a phenylene group.

3. Method of claim 1 wherein said curing agent is selected from the group consisting of strong aromatic acids containing at least one inorganic substituent, strong mineral acids, and mixtures thereof.

4. Method of claim 1 wherein heating in step (a) is initially at up to 500° C. for up to 24 hours, and said curing agent is selected from the group consisting of mineral acids, aromatic organic acids containing at least one inorganic substituent, and mixtures thereof.

5. Method of claim 1 wherein heating in step (a) is at 180° to 400° C. for 2 to 16 hours followed by postcuring to enhance physical properties of said polymers; the amount of said curing agent is 0.1 to 20% based on the weight of said monomer; said curing agent is selected from the group consisting of tolenesulfonic acids; benzenesulfonic acids; naphthalenesulfonic acids; strong mineral acids; aminotoluenesulfonic acids; phenylphosphoric acids; phenylphosphonic acids; lower alkyl phosphonic acids; phenylboric acids; Lewis acids selected from the group consisting of aluminum compounds, gallium compounds, and boron compounds; and mixtures thereof; and the amount of said curing agent is 0.1-20%, based on the weight of said monomer.

6. Method of claim 3 wherein said heating in step (a) is initially at a temperature above the melting temperature of said monomer but below the decomposition temperature of said polymer for up to 24 hours, said monomer is selected from the group consisting of 4,4'-bis (3,4-dicyanophenoxy)biphenyl, 2,2'-bis [4-(3,4-dicyanophenoxy)phenyl] propane 2,2'-bis [4-(3,4-dicyanophenoxy)phenyl] hexafluoropropane, 3,3',4,4'-benzophenone tetracarboxylic anhydride, and mixtures thereof; said curing agent is selected from the group consisting of p-toluenesulfonic acid, monohydrate of p-toluenesulfonic acid, naphthalenesulfonic acid, monohydrate of naphthalenedisulfonic acid, benzenesulfonic acid sulfuric acid, sulfurous acid, sulfonic acid, hydrochloric acid, 7-amino-1,3-naphthalenedisulfonic acid, 3-amino-4-hydroxybenzenesulfonic acid, phenylphosphoric acid, phenylphosphonic acid, phosphonic acid, nitric acid, diphenylphosphonic acid, propylphosphonic acid, aluminum trichloride, boric acid, phenylboric acid, and mixtures thereof; and the amount of said curing agent is 0.1 to 20% based on the weight of said monomer.

7. Method for preparing a polymer comprising: (a) heating a diphthalonitrile monomer to a temperature in the range from the melting point of said di-phthalonitrile monomer to about the decomposition temperature of said polymer; (b) mixing an effective amount of a curing agent with said monomer, said curing agent is selected from the group consisting of strong aromatic acids containing at least one sulfonic acid substituent, strong mineral acids, and mixtures thereof; (c) continuing heating until gelation occurs and said polymer is obtained having Tg in excess of about 250° C.; said monomer is represented by the following structural formula:

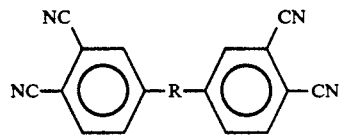

wherein R in said monomer is selected from the group consisting of diethoxy of the formula —OR'O— where R' is selected from the group consisting of —ArC$_n$H$_{2n}$Ar—, —Ar$_m$—, —ArC$_3$F$_6$Ar—, —C$_n$H$_{2n}$—, —ArSO$_2$Ar—, —ArCOAr—, and mixtures thereof, where m is an integer of 1-10, n is an integer of 2-30, and Ar represents an aromatic group; and alkylene hydrocarbons containing fluorine substituents.

8. Method for preparing a prepolymer comprising: (a) heating a diphthalonitrile monomer to a temperature in the range from the melting point of said di-phthalonitrile monomer to the decomposition temperature of di-phthalonitrile polymer; (b) mixing an effective amount of a curing agent with said monomer, said curing agent is selected from the group consisting of acids having ionization constants from 1 to $1 \times 10^{-5}$; (c) and quenching the monomer before gellation occurs; and said monomer is represented by the following structural formula:

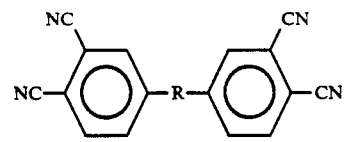

wherein R in said monomer is selected from the group consisting of diethoxy of the formula —OR'O— where R' is selected from the group consisting of —ArC$_n$H$_{2n}$Ar—, —Ar$_m$—, —ArC$_3$F$_6$Ar—, —C$_n$H$_{2n}$—, —ArSO$_2$Ar—, —ArCOAr—, and mixtures thereof, where m is an integer of 1-10, n is an integer of 2-30, and Ar represents an aromatic group; and alkylene hydrocarbons containing fluorine substituents.

9. Method of claim 8 including the steps of cooling said prepolymer to about room temperature, storing said prepolymer at room temperature, and heating said prepolymer for a time and a temperature until polymer Tg is in excess of 250° C.

10. Polymer produced by the method defined by claim 1.

11. Polymer of claim 10 wherein said curing agent is selected from acids having ionization constants in the range of 0.1 to $1 \times 10^{-4}$.

12. Polymer of claim 10 wherein m is 1–3, n is 6–20, Ar is phenylene group, and Tg of said polymer is above 250° C.

13. Polymer of claim 10 wherein said curing agent is selected from the group consisting of toluenesulfonic acids; benzenesulfonic acids; naphthalenesulfonic acids; strong mineral acids; aminotoluenesulfonic acids; phenylphosphoric acids; phenylphosphonic acids; lower alkyl phosphonic acids; phenylboric acids; Lewis acids selected from the group consisting of aluminum compounds, gallium compounds, and boron compounds; and mixtures thereof; and the amount of said curing agent is 0.1–20%, based on the weight of said monomer.

14. Polymer of claim 10 wherein said monomer is selected from the group consisting of 4,4'-bis(3,4-dicyanophenoxy)biphenyl, 2,2'-[4-(3,4-dicyanophenoxy)phenyl] bispropane, 2,2'[4-(3,4-dicyanophenoxy)phenyl] hexafluoropropane, 3,3',4,4'-benzophenone tetracarboxylic anhydride, and mixtures thereof; said curing agent is selected from the group consisting of p-toluenesulfonic acid, monohydrate of p-toluenesulfonic acid, naphthalenesulfonic acid, monohydrate of naphthalenesulfonic acid, benzenesulfonic acid, sulfuric acid, sulfurous acid, sulfonilic acid, hydrochloric acid, 7-amino-1,3-naphthalenedisulfonic acid, 3-amino-4-hydroxybenzenesulfonic acid, phenylphosphoric acid, phenylphosphonic acid, phosphoric acid, nitric acid, diphenylphosphonic acid, propylphosphonic acid, aluminum trichloride, boric acid, phenylboric acid, and mixtures thereof; and the amount of said curing agent is 0.1% to 20% based on the weight of said monomer.

15. Polymer produced by the method defined by claim 3.

16. Polymer produced by the method defined by claim 6.

17. Phthalonitrile polymer obtained according to the process of claim 5.

18. Prepolymer produced by the method defined by claim 9.

* * * * *